United States Patent [19]

Kamiguchi et al.

[11] Patent Number: 5,154,935
[45] Date of Patent: Oct. 13, 1992

[54] INJECTION PRESSURE CONTROL APPARATUS FOR AN ELECTRICALLY-OPERATED INJECTION MOLDING MACHINE

[75] Inventors: Masao Kamiguchi; Noriaki Neko, both of Oshino, Japan

[73] Assignee: Fanuc Limited, Yamanashi, Japan

[21] Appl. No.: 668,514

[22] PCT Filed: Jul. 19, 1990

[86] PCT No.: PCT/JP90/00932

§ 371 Date: Mar. 25, 1991

§ 102(e) Date: Mar. 25, 1991

[87] PCT Pub. No.: WO91/01869

PCT Pub. Date: Feb. 21, 1991

[30] Foreign Application Priority Data

Jul. 27, 1989 [JP] Japan .................. 1-192753

[51] Int. Cl.$^5$ .............................. B29C 45/77
[52] U.S. Cl. .................. 425/149; 264/40.3; 425/170
[58] Field of Search .......... 425/145, 149, 170; 264/40.3

[56] References Cited

U.S. PATENT DOCUMENTS

| | | | |
|---|---|---|---|
| 4,828,473 | 5/1989 | Otake et al. | 425/145 |
| 4,968,462 | 11/1990 | Hara | 425/149 |
| 4,970,447 | 11/1990 | Kamiguchi et al. | 425/149 |
| 5,023,028 | 6/1991 | Kamiguchi et al. | 425/149 |

FOREIGN PATENT DOCUMENTS

| | | |
|---|---|---|
| 52486 | 11/1983 | Japan . |
| 61-249731 | 6/1986 | Japan . |
| 61-154820 | 7/1986 | Japan . |
| 62-44417 | 2/1987 | Japan . |
| 63-69618 | 3/1988 | Japan . |
| 63-130326 | 6/1988 | Japan . |
| 63-233816 | 9/1988 | Japan . |
| 64-18619 | 1/1989 | Japan . |

*Primary Examiner*—Tim Heitbrink
*Attorney, Agent, or Firm*—Staas & Halsey

[57] ABSTRACT

An injection/hold pressure control apparatus which permits the production of high-quality molded articles without the need of using an expensive internal mold pressure sensor. When a plurality of points specifying a target injection/hold pressure curve represented as a function of the time period elapsed after the start of injection are manually input in succession, a processor (109) of a numerical control unit (100) calculates a group of target injection/hold pressure data on the basis of the target pressure curve drawn on a screen of a display unit (113), and stores them in a lookup table in a shared memory (102). Upon start of the injection, a comparator (11), connected to a pressure sensor (4) mounted on an injection screw (1) for detecting an actual injection/hold pressure, is connected to the numerical control unit through a first changeover switch (6). The target pressure data is successively read out from the lookup table and delivered to the comparator, and the drive of an injection servomotor (2) is controlled by a torque control section of a servo circuit (200) responsive to the comparator output indicating the deviation between the actual pressure and the target pressure, so that the injection/hold pressure is always controlled to a proper value in a closed-loop, to thereby improve the quality of molded articles.

9 Claims, 3 Drawing Sheets

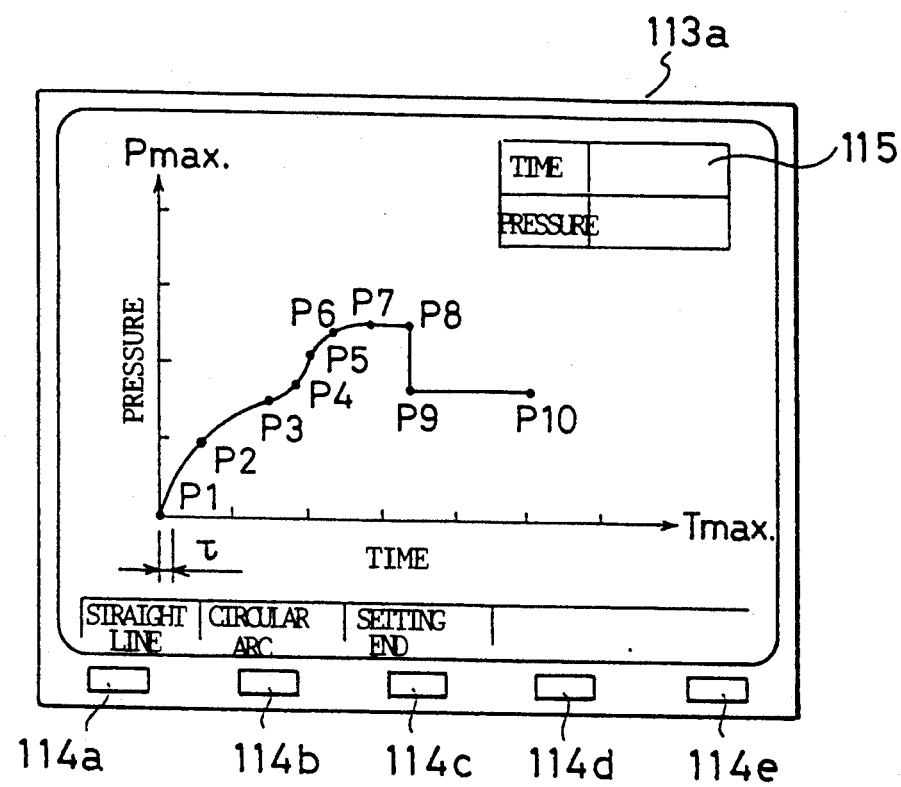

INJECTION PRESSURE CONTROL APPARATUS FOR AN ELECTRICALLY-OPERATED INJECTION MOLDING MACHINE

TECHNICAL FIELD

The present invention relates to an injection pressure control apparatus for an electrically-operated injection molding machine, and more particularly, to an injection pressure control apparatus which permits the production of high-quality molded articles without the need of using an expensive internal mold pressure sensor.

BACKGROUND ART

Conventionally, a hydraulically-operated injection molding machine is known, which is so designed as to maintain the maximum internal mold pressure at a predetermined target value during a period for the filling of a mold with a molten resin, thereby preventing excessive or short filling. In the injection molding machine of this type, the internal mold pressure is subjected to closed-loop control by means of a hydraulic mechanism in accordance with a feedback signal indicative of the internal mold pressure and supplied from a pressure sensor disposed in a resin passage of the mold (Japanese Patent Publication No. 58-52486). However, the internal mold pressure sensor, which is arranged to be embedded in the resin passage, is high in cost. Moreover, since the internal mold pressure sensor is exposed to molten resin, it is liable to be lower in performance and have a shorter life. These drawbacks are particularly noticeable when the pressure sensor is embedded in a hot-runner mold. Furthermore, it is difficult to dispose the internal mold pressure sensor in the hot-runner mold which provides only a small embedding space for the sensor.

Also known is an electrically-operated injection molding machine which is so designed as to control the injection speed in an injection process to a target value which can be variably set in accordance with the axial moved position of an injection screw, control the hold pressure in a hold process to a target value in accordance with a detection output supplied from pressure detecting means, formed of an internal mold pressure sensor or a strain gauge, and optimize the timing for the switching from the injection process to the hold process (Japanese Provisional Patent Publication No. 62-218118). In the injection molding machine of this type, however, the injection pressure sometimes becomes improper. In this case, the quality of molded articles is degraded.

DISCLOSURE OF THE INVENTION

The object of the present invention is to provide an injection pressure control apparatus for an electrically-operated injection molding machine, which permits the production of high-quality molded articles without the need of using an expensive internal mold pressure sensor.

In order to achieve the above object, according to the present invention, there is provided an injection pressure control apparatus mounted to an electrically-operated injection molding machine in which an injection screw is driven in an axial direction thereof by means of a servomotor, to thereby apply an injection pressure to molten resin through the injection screw. The injection pressure control apparatus comprises: a pressure sensor mounted on the injection screw for generating an output indicative of a pressure applied to the injection screw by the molten resin and corresponding to an actual injection pressure; setting means for setting a target injection pressure beforehand; and control means for controlling the actual injection pressure to the target injection pressure in a closed-loop in accordance with the pressure sensor output and the target injection pressure.

Preferably, the apparatus of the present invention is operable to control a hold pressure in a like manner, and the setting means is operable to variably set the target injection pressure in accordance with a time period elapsed from an instant at which injection starts, and the control means is operable to control an output torque of the servomotor, thereby controlling the actual injection pressure to the target injection pressure.

According to the present invention, as described above, the actual injection pressure is controlled to the target injection pressure in a closed-loop in accordance with the pressure sensor output indicative of the actual injection pressure and the target injection pressure set beforehand, whereby the injection pressure can be rationalized, and thus the quality of molded articles can be improved. Since it is only required for the pressure sensor to be arranged such that the sensor is enabled to be mounted on the injection screw and to detect the pressure acting on the injection screw from the molten resin, the manufacturing costs of the pressure sensor can be made much lower than those of an internal mold pressure sensor, which should be arranged to be embedded in a mold. Further, the pressure sensor can be prevented from being lowered in performance due to the exposure to the molten resin, and therefore, the service life is prolonged and the maintenance is facilitated. Furthermore, no substantial difficulties are encountered in mounting the sensor on an injection molding machine equipped with a hot-runner mold which provides only a small embedding space for the sensor.

Preferably, the target injection pressure can be variably set in accordance with the time period elapsed after the start of injection, and thus the injection pressure can be properly controlled. Further, the hold pressure can be rationalized in a like manner. Moreover, since the injection/hold pressure is controlled by controlling the servomotor output torque, the injection/hold pressure can be accurately controlled.

BRIEF DESCRIPTION OF THE DRAWINGS

FIG. 3 is a diagram illustrating an injection/hold pressure setting screen displayed on a manual data input device shown in FIG. 1; and FIG. 4 is a diagram illustrating a lookup table loaded in a shared memory shown in FIG. 1 and storing target injection/hold pressures.

BEST MODE OF CARRYING OUT THE INVENTION

Figure 1:
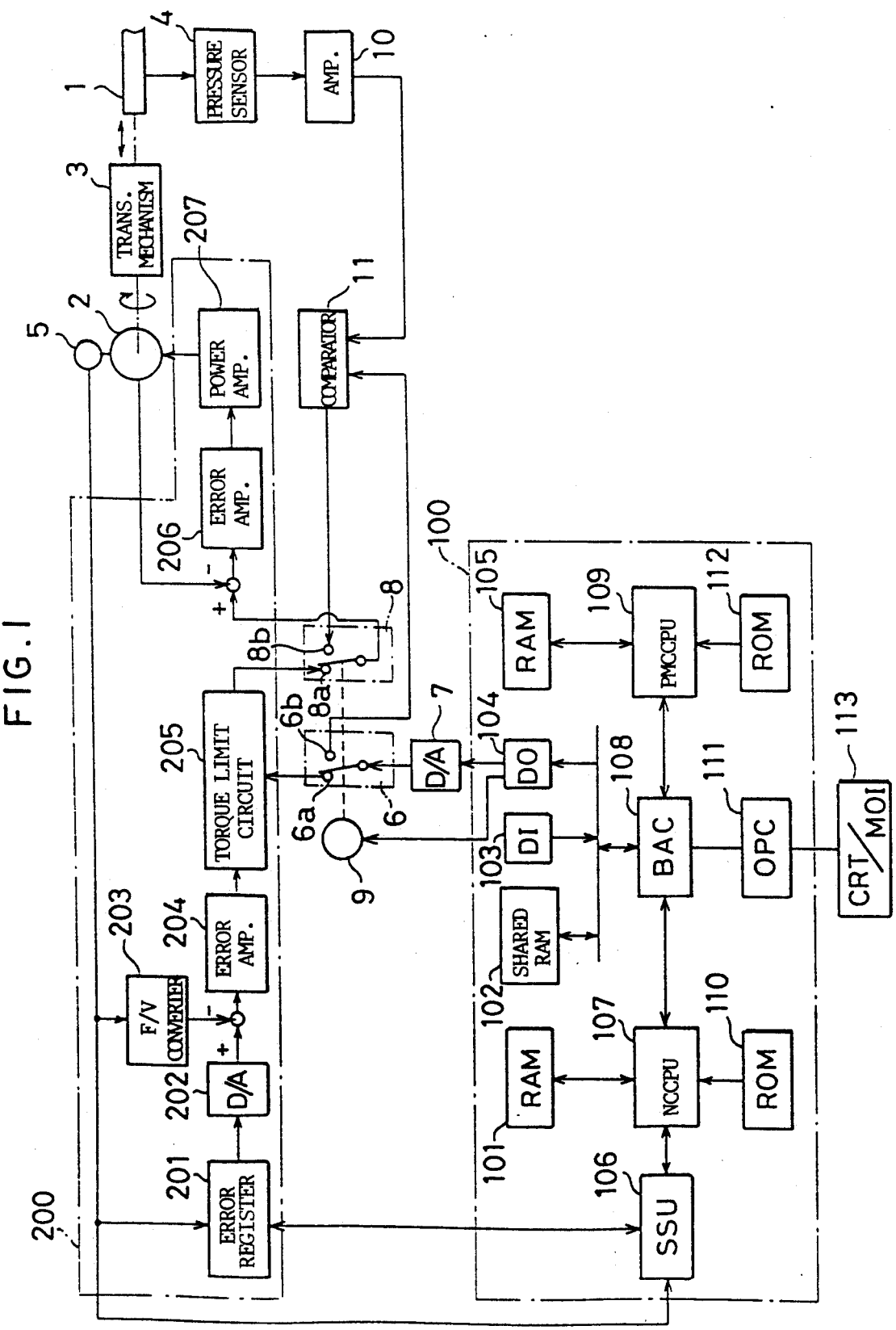
FIG. 1 is a block diagram showing a principal part of an electrically-operated injection molding machine equipped with an injection/hold pressure control apparatus according to one embodiment of the present invention.

An injection/hold pressure control apparatus (hereinafter referred to as injection pressure control apparatus)

according to one embodiment of the present invention is mounted, for example, on an electrically-operated injection molding machine which is provided with various operating sections such as an injection mechanism, a clamping mechanism, a product ejector mechanism which are individually equipped with servomotors serving as their drive sources. As shown in FIG. 1, the injection pressure control apparatus comprises a numerical control unit (hereinafter referred to as NC unit) 100 having an additional function of controlling the drive of the various operating sections of the injection molding machine, servo circuits for individually controlling the drive of the servomotors for the various operating sections, and a pressure sensor 4 formed of, e.g., a wire resistance strain gauge and mounted on a screw 1. This pressure sensor 4 is relatively low-priced, because the sensor should only be constructed such that it can be mounted on the screw 1 and can detect the pressure acting on the screw from a molten resin. Moreover, since the pressure sensor is provided not in a mold but on the screw, no substantial difficulties are encountered in mounting the sensor onto the injection molding machine even if the machine is of a type equipped with a hot-runner mold. Maintenance of the sensor is also facilitated. In FIG. 1, reference numeral 2 denotes an injection servomotor operatively coupled to the injection screw 1 through a transmission mechanism 3 and provided with a pulse coder 5, and reference numeral 200 denotes a servo circuit associated therewith. Illustrations of the other servomotors, pulse coders and servo circuits are omitted.

The NC unit 100 comprises a microprocessor (hereinafter referred to as NCCPU) 107 for numerical control, and a microprocessor (hereinafter referred to as PMCCPU) 109 for a programmable machine controller. Connected through busses to the PMCCPU 109 are a read-only memory (ROM) 112 storing a sequence program, and a random-access memory (RAM) 105 for temporarily storing data. Connected through busses to the NCCPU 107 are a RAM 101 for temporarily storing data, a ROM 110 storing a management program for globally controlling the injection molding machine, and a servo interface (SSU) 106 to which the aforementioned various servo circuits and pulse coders are connected.

The NC unit 100 further comprises a shared memory 102, an input circuit 103, an output circuit 104, an operator panel controller (OPC) 111, and a bus arbiter controller (BAC) 108 interposed between the aforesaid elements 102 to 104, 107, 109 and 111. The shared memory 102, which is formed of, e.g., a nonvolatile RAM, includes a first memory area for storing an NC program and a second memory area for storing various molding condition parameters and a lookup table for target injection/hold pressure setting, mentioned later. The BAC operates to allow one of the CPUs, in a certain control period, to use associated busses which connects the aforesaid elements.

Reference numeral 113 denotes a manual data input device (CRT/MDI) which is connected to the OPC 111 and constitutes part of the injection pressure control apparatus. The CRT/MDI comprises a keyboard (not shown) having various keys, including ten-keys, cursor keys, and input keys, and a CRT display unit (FIG. 3) having a display screen 113a and software keys 114a to 114e located beneath the screen. Each software key is operable in a plurality of modes, and is allocated with a function which is different between these modes, so that various functions more than the total number of the software keys can be achieved.

The servo circuit 200 associated with the injection servomotor 2 comprises an error register 201 which is connected to the SSU 106 of the NC unit 100 and the pulse coder 5 attached to the servomotor 2. The error register 201 is arranged to receive distribution pulses (position commands) periodically supplied from the NCCPU 107 via the SSU 106 and a feedback pulse delivered from the pulse coder 5 every time the servomotor 2 rotates by a predetermined angle, and generate an output indicative of the deviation (positional deviation) between a target rotational position and an actual rotational position of the servomotor 2. A D/A converter 202 for converting the error register output into a speed command voltage and an F/V converter 203 for generating a voltage indicative of the generation frequency (actual speed) of the pulse coder output pulses are connected to a first error amplifier 204 for amplifying the difference (speed deviation) between the output voltages of the two converters.

A D/A converter 7 and a first changeover switch 6 are interposed between the output circuit 104 of the NC unit 100 and a torque limit circuit 205 which receives the output (torque command voltage) of the error amplifier 204. A first stationary contact 6a of the switch 6, which is normally connected to a movable contact of the switch 6, is connected to a data input terminal of the torque limit circuit 205, while a second stationary contact 6b of the switch 6 is connected to a first input terminal of a comparator 11. A second input terminal of the comparator 11 is connected through an amplifier 10 to the output terminal of the pressure sensor 4, and the output terminal of the comparator is connected to a second stationary contact 8b of a second changeover switch 8. A first stationary contact 8a of the switch 8, which is normally connected to a movable contact of the switch 8, is connected to the output terminal of the torque limit circuit 205. Further, the output circuit 104 of the NC unit 100 is connected to a relay 9 which is operable to shift the respective movable contacts of the first and second changeover switches 6 and 8 between their first and second stationary contacts. A second error amplifier 206, to which a current detector (not shown) attached to the servomotor 2 for detecting a driving current flowing through the servomotor and the output terminal (movable contact) of the second changeover switch 8 are connected, is connected to through a power amplifier 207 the servomotor 2.

Figure 2:
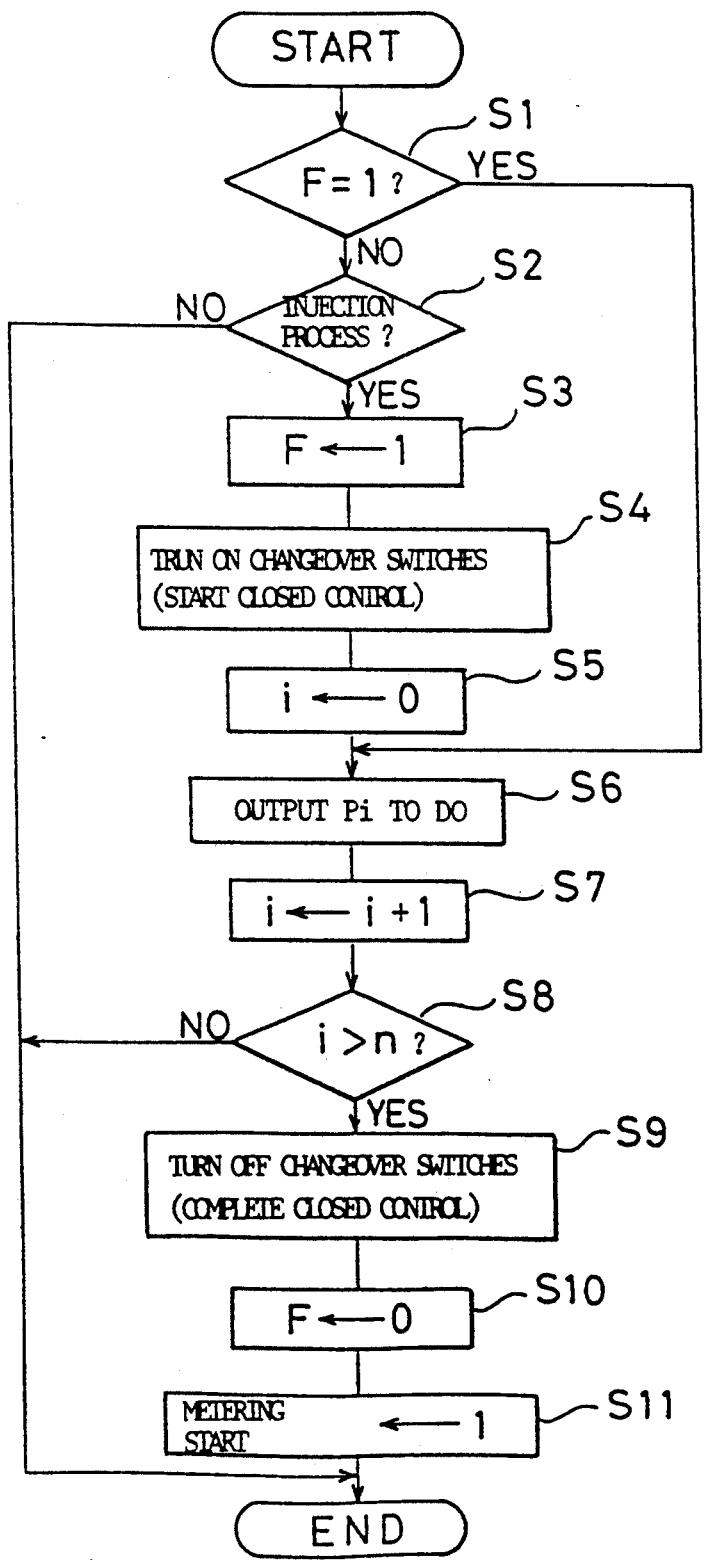
FIG. 2 is a flowchart showing an injection/hold control process executed by a microprocessor for a programmable machine controller shown in FIG. 1.

Referring now to FIGS. 2 to 4, the operation of the injection molding machine of FIG. 1 will be described.

Prior to the execution of injection molding cycles, an operator sets a proper target injection/hold pressure (hereinafter referred to as target injection pressure) in order to improve the quality of molded articles. To this end, the operator first operates the CRT/MDI 113 to select an injection pressure setting mode. Under the control of the NC unit 100 which responds to this mode selection, an injection pressure setting screen shown in FIG. 3 is displayed on the CRT display 113a. In this embodiment, it is possible to set a target injection pressure which is represented as a function of the time period elapsed after the start of injection. More specifically, a target injection pressure curve which consists of one or more straight lines, one or more circular arcs, or a combination thereof. In this respect, a time axis and a pressure axis are displayed on the CRT screen 113a. In the injection pressure setting mode, a straight line declarative function, circular arc declarative function, and setting ending function are allocated to the software keys 114a to 114c, respectively, and a message indicating this function allocation is displayed on the CRT screen.

Then, the operator sets the target injection pressure curve on the CRT screen. When setting the curve of FIG. 3, for example, the operator operates the software key 114b in order to declare that the target pressure curve section to be set this time is formed of a circular arc. Subsequently, the operator operates the cursor key to move a cursor to a start point P1 of a first target curve section, and then operates the input key to input the start point P1. When an intermediate point P2 and an end point P3 are input in a like manner, a first circular arc P1P3, which constitutes the first curve section, is drawn on the CRT screen 113a under the control of the NC unit 100. Second and third circular arcs P3P5 and P5P7, which respectively constitute second and third curve sections, are drawn in the same manner. Then, the operator operates the software key 114a to declare that the target pressure curve section to be set this time is a straight line. Then, the operator operates the input key, with the cursor located on an end point P7 of the third circular arc, to thereby input a start point P7 of a fourth curve section formed of a straight line, and further inputs an end point P8 of the latter section. In response to this input operation, a straight line P7P8 is drawn. Subsequently, in response to the entry of the respective start and end points of fifth and sixth curve sections each formed of a straight line, straight lines P8P9 and P9P10 are drawn. While the aforesaid target injection pressure curve is being set, numerical data individually indicative of the time and injection pressure corresponding to the cursor position are displayed on a data display section 115 of the CRT screen. The operator can therefore strictly set the target injection pressure curve with reference to the displayed numerical data. After completion of the target curve setting, when the operator operates the software key 114c to command the end of the setting, the NC unit 100 loads the lookup table of the shared memory 102 with a group of target injection/hold pressure data.

More specifically, in response to the operation of the setting end key 114c, the CPU, e.g., the PMCCPU 109, calculates target injection/hold pressures pi at individual points of time corresponding to time periods $i\tau$ ($i=0, 1, \ldots, n$) elapsed from an instant at which the injection starts, on the basis of an equation representative of the target injection/hold pressure curve set in the aforesaid manner and a time interval $\tau$ determined beforehand by taking account of the required pressure control accuracy. Then, the CPU loads the thus calculated values into corresponding address regions (records) of the lookup table (see FIG. 4). The lookup table is composed of records whose number is equal to a value N ($=Tmax/\tau$) obtained by dividing the maximum value Tmax on the time axis by the predetermined time interval $\tau$. The value n, which is equal to a value obtained by dividing the period of time between the start of injection and the end of hold by the predetermined time interval $\tau$, represents the final hold control period. In FIG. 4, target pressures for (n+1)-th to N-th records of the lookup table are left undefined.

After the target injection/hold pressure data are loaded into the lookup table, the injection molding cycle is executed basically in the conventional manner by means of the injection molding machine under the control of the NC unit 100. In brief, the injection molding machine is sequence-controlled by the PMCCPU 109 and pulses are distributed from the NCCPU 107 to the servo circuits to thereby control the drive of the servomotors for various axes, in accordance with the NC program, sequence program, and various molding condition parameters.

In the following, the operation of the injection molding machine in an injection/hold process which constitutes the principal part of the present invention, will be mainly explained.

During the injection molding cycle, the PMCCPU 109 of the NC unit executes the injection/hold control of FIG. 2 at intervals of a period which is equal to the predetermined time interval $\tau$. Namely, in each control period, the CPU 109 first determines whether or not a flag F is set to the value "1" which indicates that the injection/hold process is being executed (Step S1). If the value of the flag F is not "1," the CPU 109 further determines whether or not the injection process is started with reference to a flag in the shared memory 102 which flag is different from the flag F and associated with the injection process (Step S2). More specifically, the CPU 109 executes the discrimination of Step S2 in accordance with the value of the different flag which is set to the value "1," indicating that the injection process is being executed, in response to the entry of an injection start signal. If it is determined in Step S2 that the injection process is not being executed, the process of FIG. 2 for the present processing period ends. In this case, a mold opening, mold closing, mold clamping, metering, or cooling process other than the injection/hold process is executed.

If it is determined in Step S2 that the injection process is being executed, on the other hand, the CPU 109 sets the flag F to the value "1" indicating that the injection/hold process is being executed (Step S3), and then actuates the relay 9 to shift the first and second changeover switches 6 and 8 to the side of the second stationary contacts 6b and 8b (Step S4). Further, the CPU 109 resets an index i to the value "0" (Step S5), reads out target injection pressure data p0 at the start of injection, stored in a zeroth record of the lookup table in the shared memory 102 corresponding to the value "0" of the index i, and outputs the data p0 through the output circuit 104 (Step S6).

At this time, the target pressure data p0 is converted into a torque command voltage in the D/A converter 7, and the resultant voltage is then applied to the first input terminal of the comparator 11 via the first changeover switch 6. The comparator 11 compares the output of the pressure sensor 4, which is applied to the second input terminal through the amplifier 10 and represents the pressure actually acting on the injection screw 1 from the molten resin, with the torque command voltage applied to the first input terminal. Thus, the present actual injection pressure and the target injection pressure are compared in the comparator 11. The comparator output (torque command voltage), which represent the deviation between the actual injection pressure and the target injection pressure, is applied to the second error amplifier 206 through the second changeover switch 8. The output of the error amplifier 206, which represents the deviation between the torque command voltage (current command) and an output voltage of the current detector indicative of an actual driving current, is applied to the injection servomotor 2 through the power amplifier 207. As a result, the output torque of the servomotor 2 is controlled such that the actual injection pressure is adjusted to the target injection pressure, whereby the injection pressure is subjected to closed-loop control.

In Step S7 following Step S6 for the delivery of the target pressure, the PMCCPU 109 increments the index i by "1," and then determines whether or not the updated value of the index i is greater than the aforesaid value n which indicates the final pressure control period (Step S8). Since the result of the determination in Step S8 is negative in this case, the process of FIG. 2 for the present processing period ends.

When the predetermined time period $\tau$ has passed after the start of injection, the CPU 109 executes the process of FIG. 2 again. In this case, since the flag F has been set to the value "1" in Step S3 of the preceding processing period, it is determined in Step S1 that the value of the flag F is "1, " whereupon the program proceeds to Step S6. In Step S6, the CPU 109 reads out a target pressure p1, which corresponds to the value ($=1$) of the index i, from the lookup table, and outputs it to the comparator 11 via the output circuit 7 and the like. As a result, the actual injection pressure is adjusted to the target injection pressure p1. Thereafter, the injection/hold process control of FIG. 2 is executed at the predetermined time intervals r in a like manner, so that the actual injection/hold pressure is controlled to the target pressures pi ($i=2, 3, \ldots, n$) for the individual processing periods. In other words, the actual injection/hold pressure changes closely following the target pressure curve P1P10 shown in FIG. 3, whereby the injection/hold pressure is rationalized, and hence the resultant molded articles are improved in quality. Moreover, since the pressure sensor 4 mounted on the screw 1 is never exposed to the molten resin, the sensor is prevented from being lowered in performance, and therefore, is prolonged in service life.

If it is determined in Step S8 of a subsequent processing period that the value of the index i is greater than the value n indicative of the final pressure control period, and therefore, the hold process is completed, the PMCCPU 109 actuates the relay 9 to shift the respective movable contacts of the first and second changeover switches 6 and 8 to the first stationary contact side (Step S9). Then, the PMCCPU 109 resets the flag F to the value "0" which indicates that the injection/hold process is not being executed (Step S10), and sets a flag, which is different from the flag F and associated with the metering process, to the value "1" indicative of a metering process commenceable state (Step S11), whereby the injection/hold control processing ends.

During the execution of the metering process, the NCCPU 107 distributes pulses to the error register 201 of the servo circuit 200 in accordance with the NC program. The deviation between the positional deviation output (speed command) from the error register and the actual speed output from the F/V converter 203 is applied to the input terminal of the torque limit circuit 205 through the first error amplifier 204. Data from the PMCCPU 109, which represents a target back pressure to be applied to the resin through the screw 1, is applied to the data input terminal of the torque limit circuit 205 via the output circuit 104, D/A converter 7, and first changeover switch 6. Accordingly, the output of the first error amplifier 204 is restricted to a level not higher than the target back pressure in the torque limit circuit 205, and is then applied to the second error amplifier 206 through the second changeover switch 8. In accordance with the result of the comparison in the error amplifier 206 between the torque limit circuit output and the actual motor driving current, a driving current is supplied from the power amplifier 207 to the servomotor 2. In this manner, the position, speed, and torque are controlled by the servo circuit 200 during the metering process.

We claim:

1. An injection pressure control apparatus for use in an electrically-operated injection molding machine in which an injection screw is driven in an axial direction thereof by means of a servomotor, to apply an injection pressure to a molten resin through the injection screw, said injection pressure control apparatus comprising:
    a pressure sensor mounted on the injection screw to generate a first output indicative of a pressure applied to the injection screw by the molten resin and corresponding to an actual injection pressure;
    input means for selectively inputting a target injection pressure curve;
    display means for displaying said target injection pressure curve;
    setting means for setting a target injection pressure based on said target injection pressure curve; and
    first control means for controlling the actual injection pressure in a closed-loop to the target injection pressure in accordance with the first output of said pressure sensor and the target injection pressure.

2. An injection pressure control apparatus according to claim 1, wherein said setting means includes means for variably setting said target injection pressure in accordance with a time period elapsed after the start of injection.

3. An injection pressure control apparatus according to claim 1, wherein said first control means includes a numerical control unit for providing said target pressure and a position command, a servo circuit having a position control section responsive to the position command supplied from said numerical control unit to provide a position output, a speed control section responsive to the position command supplied from said position control section to provide a speed output, and a torque control section responsive to the speed output of said speed control section to control an output torque of said servomotor;
    wherein said injection pressure control apparatus further includes a comparator connected to said pressure sensor, a first changeover switch for selectably connecting any one of said speed control section and said comparator to said numerical control unit, and a second changeover switch for selectably connecting any one of said speed control section and said comparator to said torque control section; and
    wherein said first control means includes means for connecting said comparator to said numerical control unit and said torque control section through the first and second changeover switches during execution of an injection process and for applying an output of said comparator, indicative of a deviation between the pressure sensor output and the target pressure, to said torque control section during the execution of said injection process.

4. An injection pressure control apparatus according to claim 2, wherein said setting means further includes a display screen, a manual data input means for inputting data, second control means, and storage means;

wherein said display means includes means for providing the target injection pressure curve to be displayed on said display screen represented as a function of the time period elapsed after the start of injection, in accordance with data manually input through said manual data input means; and said second control means calculating target injection pressure data for each of a plurality of time points after the start of injection based on of said target injection pressure curve and for providing the calculated data;

said storage means storing the calculated data.

5. An injection pressure control apparatus according to claim 4, wherein said input means allows for input of the target injection pressure curve in successive one of straight line and circular arc sections.

6. An injection pressure control apparatus according to claim 1, wherein the injection molding machine is operable to apply a hold pressure to the molten resin through said injection screw, said pressure sensor being operable to generate a second output indicative of a pressure corresponding to an actual hold pressure, and wherein said setting means includes means for setting a target hold pressure, and wherein said first control means includes means for controlling the actual hold pressure in a closed-loop to the target hold pressure, in accordance with the first pressure sensor output and the target hold pressure.

7. An injection pressure control apparatus according to claim 1, wherein said setting means includes calculating means for calculating the target injection pressure at a plurality of time periods elapsed from when injection starts based on the target injection pressure curve and a time interval.

8. An injection pressure control apparatus according to claim 1, wherein said input means includes means for arbitrarily moving the target injection pressure curve on said display means.

9. An injection pressure control apparatus according to claim 8, wherein said display means includes means for displaying the target injection pressure curve using time and injection pressure axes.

* * * * *